Patented Nov. 30, 1948

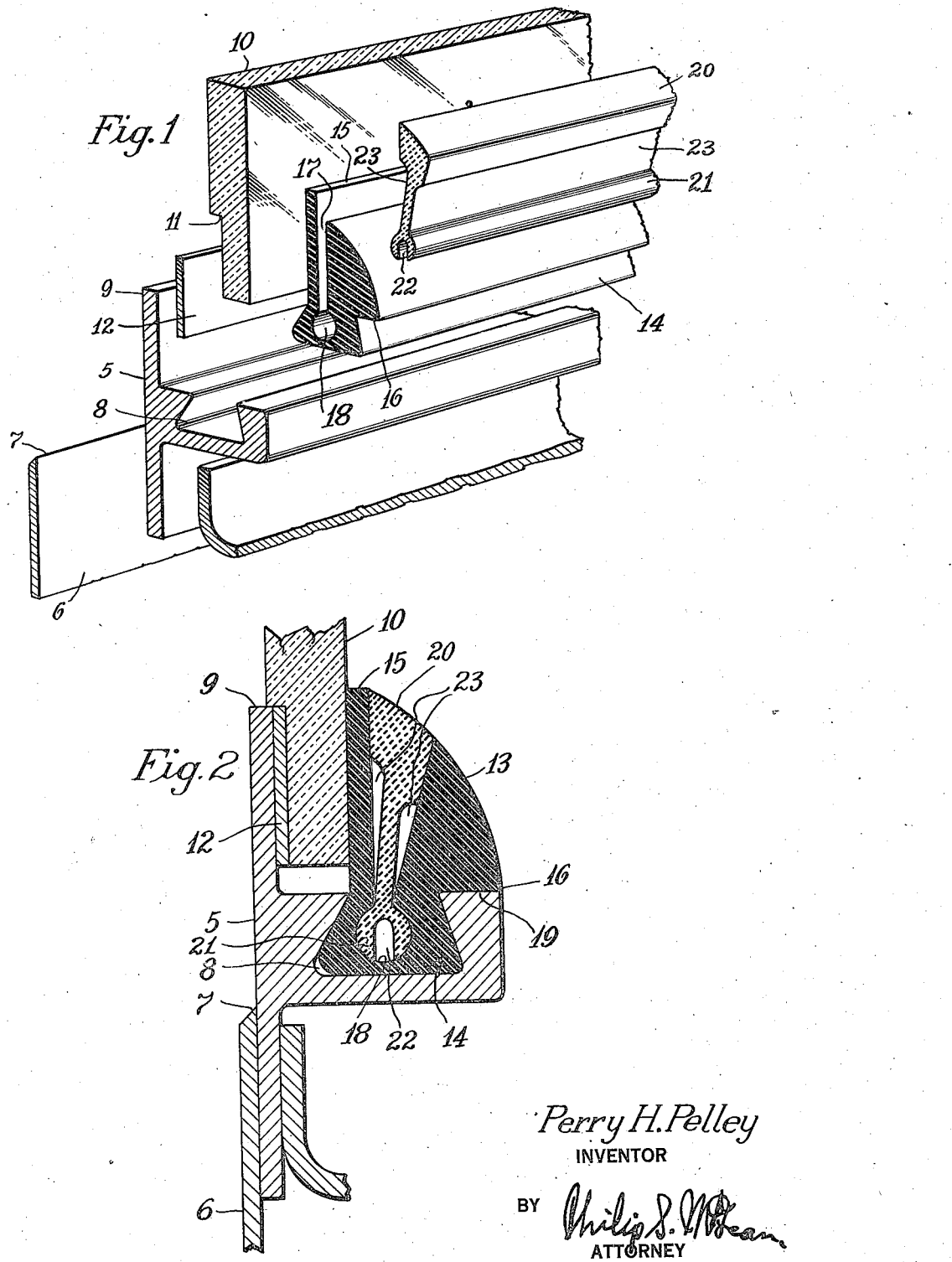

2,454,975

UNITED STATES PATENT OFFICE 2,454,975

WINDOW MOLDING

Perry H. Pelley, Wichita, Kans., assignor to Beech Aircraft Corporation, Wichita, Kans., a corporation of Delaware Application April 5, 1946, Serial No. 659,761

7 Claims. (Cl. 189—78)

The invention herein disclosed relates to the molding construction for windows, particularly windows in aircraft.

Objects of the invention are to provide a molding which while particularly secure in holding the window tightly in place, may be quickly and easily installed and when so desired, be easily removed.

Other objects of the invention are to provide a form of window molding which will be self-compensating to slight variations in the fit of the parts and which with its many advantages may be produced at relatively low cost.

Other desirable objects and the novel features through which the purposes of the invention are attained are set forth or will appear in the course of the following specification.

The drawing accompanying and forming part of the specification illustrates one of the present commercial embodiments of the invention. Structure, however, may be modified and changed as regards the immediate illustration, all within the true intent and broad scope of the invention as hereinafter defined and claimed.

Fig. 1 in the drawing is a broken perspective view illustrating the composite parts of the window structure in separated relation;

Fig. 2 is an enlarged broken sectional detail of the completely assembled structure.

In the illustration a rigid frame member is shown at 5 secured to the wall or supporting structure 6 about the window opening 7.

This frame member is shown constructed with an undercut dovetail groove or channel 8 and with an upstanding flange 9 for supporting the window 10.

The latter is indicated as shouldered at 11 about its edges to engage over the upstanding flange of the frame and to receive the more or less customary sealing strip 12.

The glass is secured in the relation described by a retainer 13 of ductile material such as rubber extrusion having a flaring rib 14 at the base, of dovetail shape, interlocking in the undercut groove of the frame, an upstanding abutment portion 15 engaging the inner face of the glass and a laterally extending shoulder 16 bearing on the inner edge of the channel frame.

To facilitate engagement in the frame the retainer strip is split or slotted downwardly through the body of the same as indicated at 17 and down into the locking or key rib 14 and there rounded out into a generally circular cavity 18. This construction permits the ductile strip to fold together or collapse sufficiently for the flaring rib to pass through into the undercut channel.

After being seated in the channel in this manner, the separated portions 15 and 16 of the retainer are spread apart into firm engagement with the glass and with the supporting shoulder 19 of the frame by a tapered wedge-like locking strip 20, having a bulbous enlargement 21 along the lower inner edge of a size to enter and interlock in the circular cavity 18.

The bulbous enlargement 21 of the locking strip is shown as split or slotted along the under side at 22 so that this part may collapse somewhat to pass through the narrow neck portion at the entrance to the circular cavity.

The locking strip may be of a semi-rigid material such as a plastic extrusion of nylon or the like.

After the window is put in place, the ductile retainer strip may be forced into its seat in the frame and then the semi-rigid locking strip be wedged down through the slot to the final position with the bulbous key portion interlocked in the cavity in the bottom of the retainer. In this final position, the enlarged edge portion of the locking strip holds the key portion of the retainer expanded in fully interlocked engagement in the channel of the frame and with the separated portions compressed against the glass and against the supporting shoulder 19 of the frame. In this compressed condition the retainer strip will compensate for slight variations, holding the window tightly and firmly sealed.

For removal or replacement the window can be quickly released by one familiar with the structure by simply prying up the locking strip at one point and then pulling it out of the key slot in the retainer.

To allow for greater self-adjustability of the parts and to save material, the sides of the wedge strip may be thinned down as indicated at 23, between the outer and inner edges of the same.

What is claimed is:

1. Window molding comprising a ductile retainer strip having a dovetail rib at the base of the same and a slot extending inwardly through the body of the strip and enlarged in a key cavity within said dovetail rib and a locking strip engageable in said slot and having an enlarged head portion at the inner edge engageable in interlocked relation in said cavity and said enlarged head portion at the inner edge of the locking strip being split to collapse in being forced through the slot into said cavity.

2. A window construction comprising a frame having a dovetail channel, a ductile retainer having a dovetail rib engageable in said channel and a supporting shoulder engageable over the edge of the frame, said retainer being slotted inwardly through the body of the same into said dovetail rib portion and provided with a generally circular enlargement at the inner end of the slot within the rib and a locking strip of wedge-like cross section engageable in said slot and having a generally circular enlargement along the inner edge of the same collapsible to enter said enlargement and engageable in interlocking relation in said enlargement at the inner end of the slot to hold said locking strip in place and to cause said locking strip to hold said rib expanded in holding engagement in the dovetail channel.

3. A window construction comprising a frame having a dovetail channel, a retainer having a dovetail rib engageable in said channel and a supporting shoulder engageable over the edge of the frame, said retainer being slotted inwardly through the body of the same into said dovetail rib portion and provided with a generally circular enlargement at the inner end of the slot and a locking strip of wedge-like cross section engageable in said slot and having an enlargement along the inner edge of the same engageable in interlocking relation in said enlargement at the inner end of the slot, said enlargement being slotted and said locking strip and retainer strip being relatively compressible to permit forcing of the locking strip into fully seated engagement in the retainer strip.

4. A window construction comprising a frame having an upstanding flange, an undercut channel in back of said flange and a supporting shoulder at the back of said channel, a window suported against said flange, a retainer strip split inwardly through the body of the same into a front holding portion engageable with the inner face of the window and a laterally shouldered portion bearing on the supporting shoulder of the frame, said strip having an enlarged rib portion interlockingly engaged in said undercut channel and the split in said retainer strip terminating in an enlarged cavity located within the widened rib portion of the retainer and a wedging locking strip entered between the split portions of the retainer and having an enlarged head portion along the inner edge of the same interlockingly engaged in said cavity.

5. A window construction comprising a frame having an upstanding flange, an undercut channel in back of said flange and a supporting shoulder at the back of said channel, a window supported against said flange, a retainer strip split inwardly through the body of the same into a front holding portion engageable with the inner face of the window and a laterally shouldered portion bearing on the supporting shoulder of the frame, said strip having an enlarged rib portion interlockingly engaged in said undercut channel and the split in said retainer strip terminating in an enlarged cavity located within the widened rib portion of the retainer and a wedging locking strip entered between the split portions of the retainer and having an enlarged head portion along the inner edge of the same interlockingly engaged in said cavity, said retainer strip and locking strip being relatively compressible and the interlocking enlarged edge portion of the locking strip being split to facilitate entry of the same into said cavity.

6. A window construction comprising a frame having an upstanding flange, an undercut channel in back of said flange and a supporting shoulder at the back of said channel, a window supported against said flange, a retainer strip split inwardly through the body of the same into a front holding portion engageable with the inner face of the window and a laterally shouldered portion bearing on the supporting shoulder of the frame, said strip having an enlarged rib portion interlockingly engaged in said undercut channel and the split in said retainer strip terminating in an enlarged cavity located within the widened rib portion of the retainer and a wedging locking strip entered between the split portions of the retainer and having an enlarged head portion along the inner edge of the same interlockingly engaged in said cavity, said retainer strip being of ductile material and the locking strip being of semi-rigid material.

7. A window construction comprising a frame having an upstanding flange, an undercut channel in back of said flange and a supporting shoulder at the back of said channel, a window supported against said flange, a retainer strip split inwardly through the body of the same into a front holding portion engageable with the inner face of the window and a laterally shouldered portion bearing on the supporting shoulder of the frame, said strip having an enlarged rib portion interlockingly engaged in said undercut channel and the split in said retainer strip terminating in an enlarged cavity located within the widened rib portion of the retainer and a wedging locking strip entered between the split portions of the retainer and having an enlarged head portion along the inner edge of the same interlockingly engaged in said cavity, said retainer strip being of ductile material in the nature of rubber extrusion and said locking strip being of a semi-rigid plastic material in the nature of nylon.

PERRY H. PELLEY.

REFERENCES CITED

The following references are of record in the file of this patent:

UNITED STATES PATENTS

| Number | Name | Date |
| --- | --- | --- |
| 2,119,685 | Peremi et al. | June 7, 1938 |
| 2,205,538 | Owen | June 25, 1940 |